July 25, 1967
J. DENIS ETAL
3,332,134
METHOD OF PRODUCTION OF CORRUGATED METAL ELEMENTS USED IN THE MANUFACTURE OF PANELS OF THE "SANDWICH" TYPE
Filed July 28, 1964
4 Sheets-Sheet 1
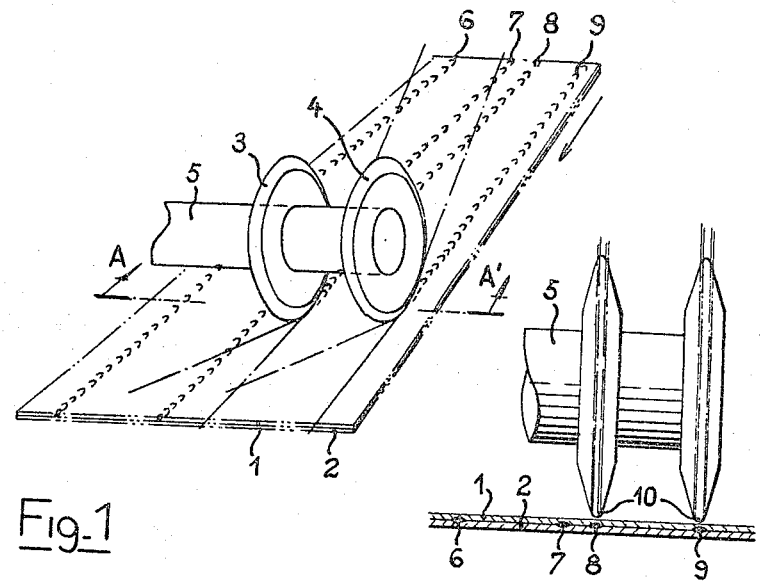
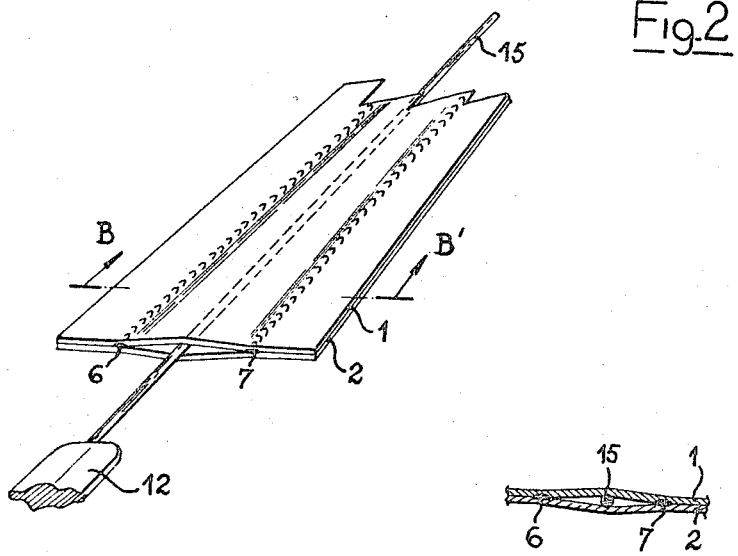
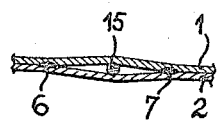
INVENTORS
Jean Denis &
Raymond Delaplace
BY Karl W. Flocks
ATTORNEY July 25, 1967
J. DENIS ETAL
3,332,134
METHOD OF PRODUCTION OF CORRUGATED METAL ELEMENTS USED
IN THE MANUFACTURE OF PANELS
OF THE "SANDWICH" TYPE
Filed July 28, 1964
4 Sheets-Sheet 2
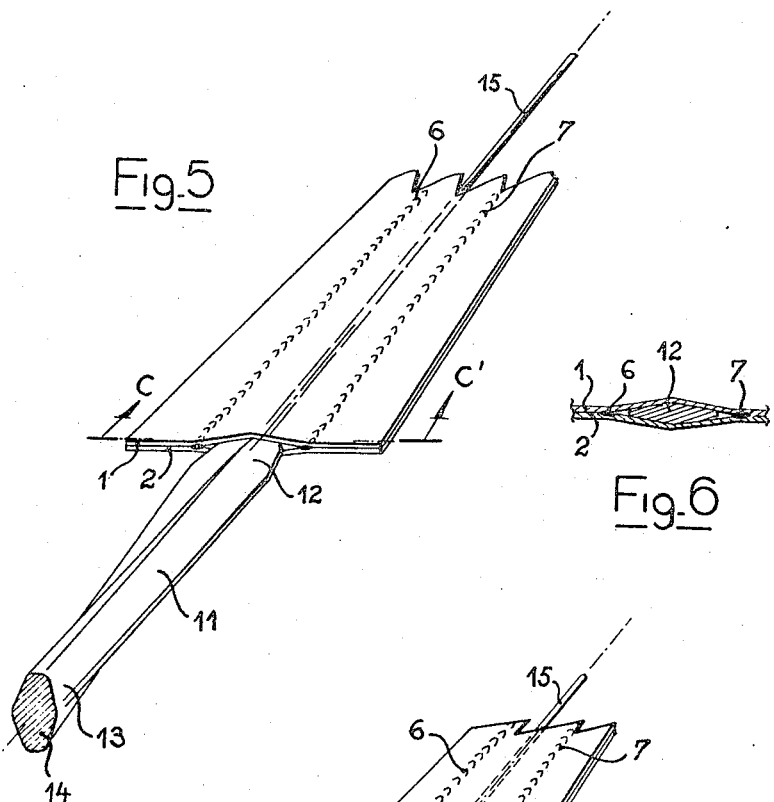
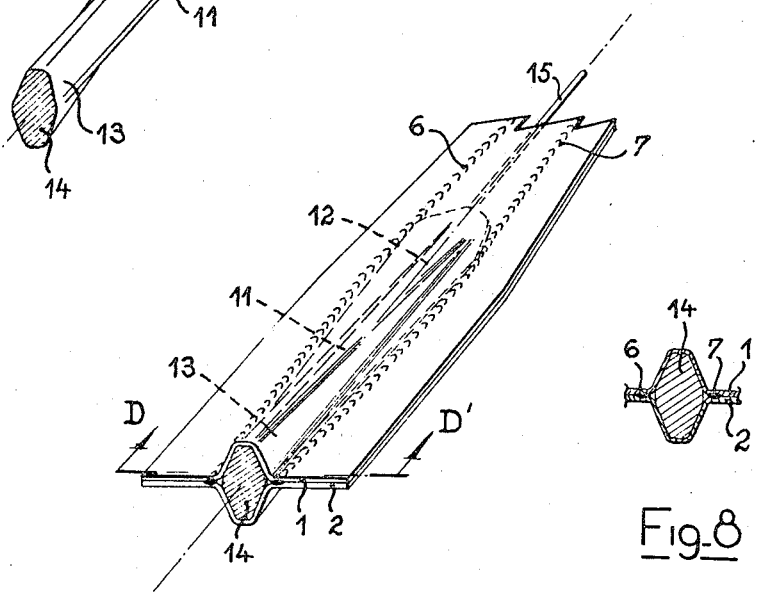
INVENTORS
Jean Denis &
Raymond Delaplace
BY Karl W. Flocks
ATTORNEY July 25, 1967    J. DENIS ETAL    3,332,134
METHOD OF PRODUCTION OF CORRUGATED METAL ELEMENTS USED
IN THE MANUFACTURE OF PANELS
OF THE "SANDWICH" TYPE
Filed July 28, 1964    4 Sheets-Sheet 3

INVENTORS
Jean Denis &
Raymond Delaplace

BY Karl W. Flocks

ATTORNEY

July 25, 1967    J. DENIS ETAL    3,332,134
METHOD OF PRODUCTION OF CORRUGATED METAL ELEMENTS USED
IN THE MANUFACTURE OF PANELS
OF THE "SANDWICH" TYPE
Filed July 28, 1964    4 Sheets-Sheet 4
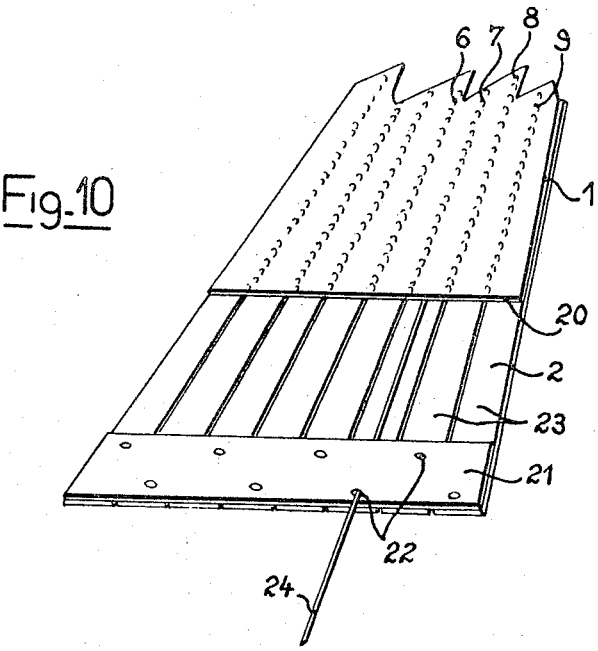
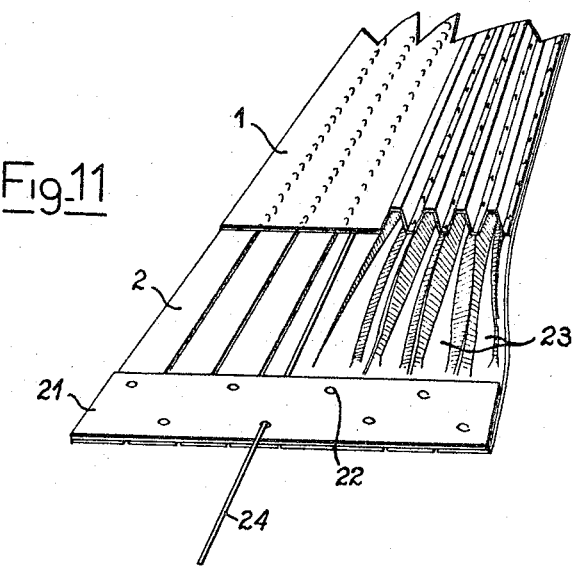
INVENTORS
Jean Denis &
Raymond Delaplace
BY Karl W. Flocks
ATTORNEY

United States Patent Office 3,332,134
Patented July 25, 1967

3,332,134
METHOD OF PRODUCTION OF CORRUGATED METAL ELEMENTS USED IN THE MANUFACTURE OF PANELS OF THE "SANDWICH" TYPE
Jean Denis, Antony, and Raymond Delaplace, Clamart, France, assignors to Nord-Aviation Société Nationale de Constructions Aéronautiques, Paris, France, a joint-stock company of France
Filed July 28, 1964, Ser. No. 385,640
Claims priority, application France, Oct. 17, 1963, 950,974
3 Claims. (Cl. 29—157.3)

ABSTRACT OF THE DISCLOSURE

A method of producing corrugations in metal sheets by welding the sheets along parallel pairs of lines, but with one pair not necessarily parallel to another pair, followed by the passing of a mandrel of evolute shape between these pairs of lines. When the mandrel is fixed a traction cable is secured to one of the sheets to pass the mandrel between the sheets.

The present invention relates to a method of obtaining, from two thin metal sheets applied one against the other, corrugated elements employed in the manufacture of panels of the "sandwich" type.

The invention also comprises, by way of new industrial products, the elements obtained by the application of the said method.

The thin metal sheets employed have a thickness of the order of 0.1 mm. or less.

The corrugated elements according to the invention are obtained in the form of two corrugated sheets assembled to each other in such manner that the lines of the peaks of the corrugations of one of the sheets coincide with the lines of the troughs of the corrugations of the other metal sheet. These elements are intended to be subsequently assembled with one or two non-corrugated metal sheets, along the lines of the peaks of the corrugations of one or the other of their faces or on their two faces, so as to constitute panels of the so-called "sandwich" type.

Panels of this kind are currently employed in the aeronautical and space industries by reason of their numerous advantages, and in particular because of their lightness and their rigidity. In particular, and this represents an advantage capable of extending their utilization in many fields, they may be considered as an assembly of fluid-tight channels which can be employed either for the circulation of a fluid, to evacuate or to supply heat for example, or to maintain a more or less high degree of vacuum.

Up to the present time, the corrugated elements used for the formation of panels of the "sandwich" type have been made from corrugated sheets on metal-working machines, the assembly being most frequently effected on welding machines of the so-called "seam-welder" type.

If account is taken of the fact that these elements must be produced with an accuracy of the same order as that of mechanical parts in order that they may be capable of being subsequently assembled in other metal sheets so as to constitute sandwhich panels, it must be recognized that the manufacture of such elements presents problems which are difficult to solve. These difficulties are still further aggravated when it is desired to obtain non-parallel or non-rectilinear corrugations from flat or curved metal sheets.

The present invention has for its object a method which eliminates the difficulties met with up to the present time and permitting in addition elements of very great length to be obtained.

The invention consists essentially, after having applied the two metal sheets one on the other, of welding them together by a practically continuous weld, along lines forming a group in which each line is parallel to at least one of the two lines adjacent to it; of passing a mandrel of evolutive shape into all the channels existing between two adjacent lines of assembly which are parallel to each other, the cross-section of the said mandrel varying in a continuous and progressive manner between a front portion of tapering shape and a rear portion having a maximum cross-section which corresponds to that of the corrugation to be obtained, and of guiding the relative movement of the mandrel and the two metal sheets in such manner as to effect at the same time a checking of the corrugated element obtained.

In one preferred form of application of the invention, the weld lines of the two sheets being parallel and equidistant from each other, and these two sheets being previously applied one flat on the other, the lines of continuous welds are obtained by electric welding with a wheel electrode, a traction cable is fixed on the tapered extremity of the mandrel and the tractive pull producing the relative displacement of the mandrel and the two welded sheets is applied along the axis of the mandrel.

Other characteristic features and advantages of the invention will become apparent from the description which follows below of one preferred form of application of the invention, reference being made to the accompanying drawings, in which:

FIG. 1 is a diagram showing the lines of assembly joining together two flat steel sheets, and also a set of two seam-welding wheels;

FIG. 2 is a cross-section taken along the line A–A' of FIG. 1;

FIG. 3 is a diagram showing the passage of the drawing cable between the two sheets and two lines of assembly parallel to each other;

FIG. 4 is a cross-section taken along the line B–B' of FIG. 3;

FIG. 5 represents the introduction stage of a mandrel between the two sheets, and two lines of assembly prallel to each other;

FIG. 6 represents a cross-section along the line C–C' of FIG. 5, this representing the minimum section of the mandrel corresponding to the evolutive form of the corrugation;

FIG. 7 shows the mandrel completely inserted between the two sheets, and two welded lines adjacent and parallel to each other;

FIG. 8 represents the maximum transverse section of the mandrel, taken along the line D–D' of FIG. 7, corresponding to the maximum transverse section of the corrugation to be obtained;

FIG. 10 is a diagram representing the particular arrangement of at least one of the extremities of the metal sheets previously assembled together;

FIG. 11 is a diagram showing this extremity during the course of shaping by the mandrel.

Figure 9:
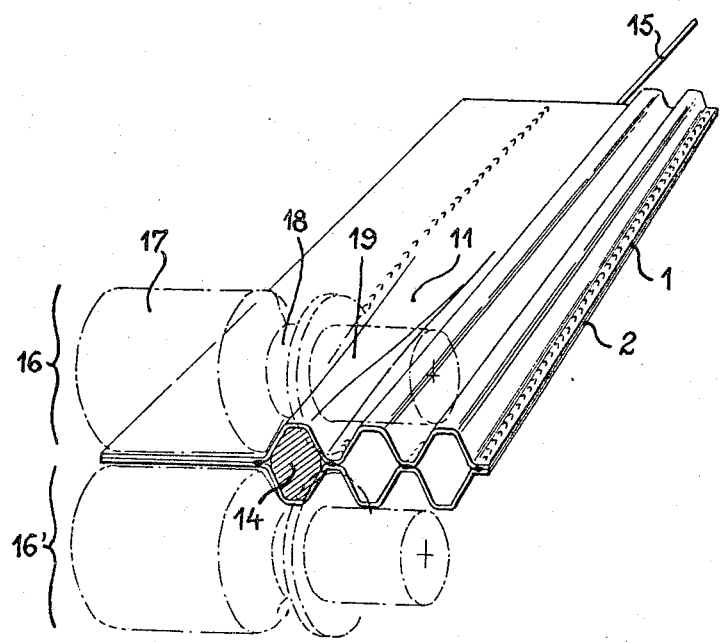
FIG. 9 shows the device for guiding the sheets and the mandrel in their relative movement, and for checking the corrugation obtained.

In FIGS. 1 and 2, two flat metal sheets 1 and 2 are applied one over the other and assembled together by means of a welding head with two wheels 3 and 4 fixed on the same shaft 5, so that their axial spacing is strictly constant. The welding of the two sheets 1 and 2 to each other is effected along the lines 6, 7, 9, 8 . . . respectively parallel to each other, but the lines of the pair 6, 7 and of the pair 8, 9 . . . are not necessarily parallel to each other. All these welds are carried out on machines of conventional type.

The wheels 3 and 4 preferably comprise an intermediate consumable element 10.

The forming operation which follows the welding can be seen from FIGS. 5 to 8. The mandrel 11 has an evolutive or progressively developed shape, between its front portion 12, which has a transverse section having the form of a flattened lozenge in FIG. 6 and its rear portion 13, the transverse section of which becomes less and less flat nearer to its rear portion, at which its maximum transverse section 14 corresponds to the final shape of the corrugation to be obtained.

A drawing cable 15 fixed to the front extremity of the mandrel 11 is introduced between the two metal sheets 1 and 2 by means of a needle (not shown).

The relative movement of the mandrel 11 and the sheets 1 and 2 may be obtained, for example, by applying a tractive pull on the said mandrel by means of the above cable 15. It can also be effected, however, by any other appropriate known means, gas under pressure for example.

The forming operation requires lubrication. This may be obtained by any known means, such as by self-lubricated mandrels, forming without oil, etc.

The arrangement shown in FIG. 9 corresponds to the case in which an additional forming of the corrugation is required, which may complete the action of the mandrel. This device comprises essentially two units 16, 16' located on each side of the metal sheets 1 and 2, the axes of the said units being both perpendicular to the axes of the corrugations, and the contact between these two guiding and control units and the two sheets 1 and 2 being effected in the plane of the principal axis of the mandrel 11. Each of the rollers 16 and 16' comprise successively, a cylindrical portion 17 bearing against the sheets not yet corrugated, an intermediate portion 18 comprising a hollow the shape of which is complementary to the outer part of a corrugation, and a further cylindrical portion 19 bearing on the peak of the corrugations.

The relative movement of the two sheets 1 and 2 and the units 16 and 16' is effected in a manner to be explained later.

In FIG. 10, which shows a particular arrangement of anchorage for the two sheets 1 and 2 when they have been assembled together one on the other, with a view to permitting their relative displacement with respect to the mandrel, the sheet 1 is shorter than the sheet 2, their line of separation 20 being perpendicular to their common longitudinal axis. The free extremity of the sheet 2 is reinforced by a narrow metal strip 21, this strip being fixed on the sheet by any appropriate method. The sheet 2 is cut along the extension of the assembly lines 6, 7, 8, 9 . . . in this case parallel to and equi-distant from each other, so as to obtain longitudinal strips 23 between the line of separation 20 and the reinforcing strip 21. A hole 22 is formed on the longitudinal axis of each of the strips 23 in order to receive successively a traction cable 24.

FIG. 11 shows the arrangement of the strips 23 before and after folding, obtained by applying successively an axial pull on the mandrel 11, not shown in this drawing, by means of the cable 24, the anchorage of the sheets 1 and 2 on the other extremity (not shown) being similar to that described and shown.

The displacement of the guiding and control device described above is conjointly operated with the movement of mandrel 11, so as to obtain a precise control of the external dimensions of the corrugations, and to obtain a cold-rolling of the metal, increasing its mechanical characteristics, which have been affected by the heating during welding. At the same time, an automatic check is obtained of the quality of the seam welds, by the effect of the force which tends to separate the sheets at the time of forming with the mandrel.

In the example which has just been described, the metal sheets have a thickness of 0.1 mm. The corrugations to be formed are twice 3 mm. in height and their pitch is 5.4 mm.; the radii are about 0.4 mm. and the flat portion of their peaks is of the order of 0.5 mm.

These indications give the order of magnitude of the dimensions of the assembly obtained, and the thickness of the sheets may be considerably smaller, down to 0.01 mm.

It will of course be understood that the present invention has only been described and shown by way of explanation and without any limitation, and that it is possible to make modifications of detail to the invention without thereby departing from the scope.

Thus, the two lines of welding between which the mandrel is passed may not be strictly parallel to each other but on the contrary may be slightly convergent, thus making it possible to obtain at a subsequent stage, sandwich panels which are slightly conical.

We claim:

1. Method of manufacturing the corrugations of the thin central elements of "sandwich" type panels with a corrugated core produced by means of a mandrel and from two overlapping welded metal sheets by continuous welding lines, characterized by the steps of overlapping two sheets to form an assembly, welding said overlapped sheets along more than two continuous lines, each weld line being at least parallel to one of the two lines adjacent thereto, positioning a traction cable between said overlapped sheets along the area thereof to be expanded, securing said traction cable to a mandrel of evolutive shape at the end opposite the end where maximum transverse cross-section of the mandrel corresponds to the shape of the corrugation; and moving said welded sheets and mandrel relative to each other by means of said traction cable secured to said mandrel to pass said mandrel successively through the portions of the sheets between two parallel weld lines to expand said portions to define corrugations.

2. Method according to claim 1 in which the element to be corrugated is fixed and the forming of the corrugations is effected by the traction of the mandrel by said cable previously disposed between the two sheets.

3. Method according to claim 1 in which it is desired to complete the mandrel action by an additional step including profiling with a guiding device constituted by two identical rollers symmetrically disposed with respect to the plane of the weld lines, the axes of the rollers being perpendicular to said weld lines, each roller comprising successively a cylindrical portion bearing against the sheets not yet corrugated, an intermediate portion comprising a hollow the shape of which is complementary to the outer part of a corrugation, and a further cylindrical portion bearing on the peak of the corrugations.

References Cited

UNITED STATES PATENTS

| | | | |
|---|---|---|---|
| 1,938,633 | 12/1933 | Markrey | 29—480 X |
| 3,028,827 | 4/1962 | Valyi | 29—480 X |
| 3,059,319 | 10/1962 | Hart et al. | 29—480 X |
| 3,206,838 | 9/1965 | Pauls | 29—157.3 |
| 3,249,989 | 5/1966 | Robinson | 29—455 |

CHARLIE T. MOON, *Primary Examiner.*

JOHN F. CAMPBELL, *Examiner.*

J. D. HOBART, *Assistant Examiner.*